United States Patent
Winkler et al.

(10) Patent No.: US 9,286,037 B2
(45) Date of Patent: Mar. 15, 2016

(54) PLATFORM FOR DISTRIBUTED APPLICATIONS

(75) Inventors: Matthew R. Winkler, Redmond, WA (US); Dhama Shukla, Sammamish, WA (US); Stephen M. Danton, Seattle, WA (US); Puravkumar B. Saraiya, Redmond, WA (US); Alexander M. DeJarnatt, Charlottesville, VA (US); Aditya Gopal Bhandarkar, Sammamish, WA (US); Ramrajprabu Balasubramanian, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 580 days.

(21) Appl. No.: 12/980,801

(22) Filed: Dec. 29, 2010

(65) Prior Publication Data

US 2012/0174058 A1 Jul. 5, 2012

(51) Int. Cl.
*G06F 9/44* (2006.01)

(52) U.S. Cl.
CPC .. *G06F 8/34* (2013.01); *G06F 8/33* (2013.01); *G06F 8/36* (2013.01)

(58) Field of Classification Search
CPC .............. G06F 8/10; G06F 8/34; G06F 8/38; G06F 8/20; G06F 8/36; G06F 8/33
See application file for complete search history.

(56) References Cited

U.S. PATENT DOCUMENTS

| | | | |
|---|---|---|---|
| 5,790,863 A * | 8/1998 | Simonyi | G06F 8/33 700/83 |
| 6,442,165 B1 | 8/2002 | Sitaraman et al. | |
| 6,993,734 B2 | 1/2006 | Baumgartner et al. | |
| 6,993,743 B2 * | 1/2006 | Crupi et al. | 717/102 |
| 7,103,874 B2 * | 9/2006 | McCollum | G06F 8/36 709/220 |
| 7,178,129 B2 * | 2/2007 | Katz | 717/108 |
| 7,188,155 B2 | 3/2007 | Flurry | |

(Continued)

FOREIGN PATENT DOCUMENTS

| | | |
|---|---|---|
| CN | 101763266 A | 6/2010 |
| WO | WO2006108290 A1 | 10/2006 |

OTHER PUBLICATIONS

Gamma, Erich; Helm, Richard; Johnson, Raplh; Vlissides, John; Design Patterns: Elements of Reusable Object-Oriented Software, 1994, Addison-Wesley Publishing Company, Inc., p. 358 (5 papes total).*

(Continued)

*Primary Examiner* — Thuy Dao
*Assistant Examiner* — Ravi K Sinha
(74) *Attorney, Agent, or Firm* — Ben Tabor; Doug Barker; Micky Minhas

(57) ABSTRACT

Embodiments are directed to providing an application model to deploy and manage composite applications and to providing model-driven software coding assistance. In an embodiment, a computer system instantiates an application design interface that is configured to display composite application components and relationships between the components. Each component includes information specifying how communication is to be conducted with the component. The computer system accesses an application manifest that includes the components and component relationships of the application. The computer system displays the composite application's components and component relationships in the instantiated visual application design interface according to the application manifest.

19 Claims, 4 Drawing Sheets

(56) References Cited

U.S. PATENT DOCUMENTS

| | | | |
|---|---|---|---|
| 7,392,314 B2 | 6/2008 | Betzler et al. | |
| 7,412,518 B1 | 8/2008 | Duigou et al. | |
| 7,526,734 B2* | 4/2009 | Vasilev et al. | 715/805 |
| 7,774,697 B2 | 8/2010 | Olander et al. | |
| 7,774,745 B2* | 8/2010 | Fildebrandt et al. | 717/104 |
| 7,890,870 B1* | 2/2011 | Metters et al. | 715/736 |
| 7,917,888 B2* | 3/2011 | Chong et al. | 717/102 |
| 7,996,814 B1* | 8/2011 | Qureshi et al. | 717/105 |
| 8,046,737 B2* | 10/2011 | Wittenberg et al. | 717/105 |
| 8,060,586 B2 | 11/2011 | Yang et al. | |
| 8,156,469 B2* | 4/2012 | Seeger | G06F 8/34 717/107 |
| 8,285,676 B2* | 10/2012 | Bahl | G06F 8/34 707/626 |
| 8,316,344 B2* | 11/2012 | Kaetker et al. | 717/103 |
| 8,341,593 B2* | 12/2012 | Fildebrandt et al. | 717/105 |
| 8,438,542 B2* | 5/2013 | Nandan | G06F 8/33 717/104 |
| 8,539,507 B2* | 9/2013 | Aveyard et al. | 717/103 |
| 8,561,048 B2* | 10/2013 | Seeger | G06F 8/34 717/109 |
| 8,719,766 B1* | 5/2014 | Walker | G06F 8/34 717/100 |
| 8,776,047 B2* | 7/2014 | Wookey | 717/175 |
| 8,893,076 B2* | 11/2014 | Softky | 717/104 |
| 9,038,037 B1* | 5/2015 | Biggerstaff | G06F 8/437 717/108 |
| 9,128,803 B2* | 9/2015 | Shukla | G06F 8/35 |
| 2002/0091990 A1* | 7/2002 | Little et al. | 717/105 |
| 2002/0144233 A1* | 10/2002 | Chong et al. | 717/105 |
| 2003/0105887 A1* | 6/2003 | Cox et al. | 709/328 |
| 2003/0120711 A1* | 6/2003 | Katz | 709/106 |
| 2004/0117759 A1 | 6/2004 | Rippert, Jr. et al. | |
| 2004/0176988 A1 | 9/2004 | Boughannam | |
| 2004/0177335 A1* | 9/2004 | Beisiegel et al. | 717/102 |
| 2004/0187140 A1* | 9/2004 | Aigner et al. | 719/328 |
| 2004/0226029 A1* | 11/2004 | Gelme | 719/328 |
| 2005/0091227 A1* | 4/2005 | McCollum | G06F 8/36 |
| 2005/0144226 A1 | 6/2005 | Purewal | |
| 2005/0160398 A1* | 7/2005 | Bjornson et al. | 717/104 |
| 2005/0166180 A1* | 7/2005 | Lemon | G06F 8/34 717/106 |
| 2005/0235248 A1* | 10/2005 | Victoria et al. | 717/102 |
| 2006/0074730 A1* | 4/2006 | Shukla et al. | 705/8 |
| 2006/0206599 A1 | 9/2006 | Milligan | |
| 2006/0236302 A1* | 10/2006 | Bateman et al. | 717/104 |
| 2006/0248121 A1 | 11/2006 | Cacenco et al. | |
| 2006/0248506 A1* | 11/2006 | Luo et al. | 717/104 |
| 2007/0033569 A1* | 2/2007 | Davidson et al. | 717/103 |
| 2007/0094364 A1 | 4/2007 | Oberhauser | |
| 2007/0150852 A1* | 6/2007 | Balderas | G06F 8/36 717/104 |
| 2007/0157179 A1* | 7/2007 | Seeger | G06F 8/34 717/136 |
| 2007/0157191 A1* | 7/2007 | Seeger | G06F 8/34 717/168 |
| 2007/0233820 A1 | 10/2007 | Schneider | |
| 2008/0195441 A1 | 8/2008 | Hacigumus | |
| 2008/0244507 A1* | 10/2008 | Hodson et al. | 717/106 |
| 2009/0013310 A1* | 1/2009 | Arner et al. | 717/120 |
| 2009/0083732 A1* | 3/2009 | Shen et al. | 717/177 |
| 2009/0106011 A1 | 4/2009 | Chen et al. | |
| 2009/0106350 A1 | 4/2009 | Chen et al. | |
| 2009/0157872 A1* | 6/2009 | Pinkston et al. | 709/224 |
| 2009/0158241 A1* | 6/2009 | Nandan | G06F 8/33 717/104 |
| 2009/0274299 A1 | 11/2009 | Caskey et al. | |
| 2009/0319951 A1 | 12/2009 | Benedetti et al. | |
| 2009/0327482 A1* | 12/2009 | Malhotra et al. | 709/224 |
| 2010/0011338 A1* | 1/2010 | Lewis | 717/105 |
| 2010/0088662 A1* | 4/2010 | Tung et al. | 717/101 |
| 2010/0093443 A1 | 4/2010 | Yan et al. | |
| 2010/0100525 A1 | 4/2010 | Huang | |
| 2010/0107136 A1 | 4/2010 | Fildebrandt et al. | |
| 2010/0195503 A1 | 8/2010 | Raleigh | |
| 2010/0198948 A1 | 8/2010 | Yang et al. | |
| 2011/0088011 A1* | 4/2011 | Ouali | 717/105 |
| 2011/0119649 A1* | 5/2011 | Kand et al. | 717/100 |
| 2011/0119651 A1* | 5/2011 | Utschig-Utschig et al. | 717/107 |
| 2011/0231365 A1* | 9/2011 | Bahl | G06F 8/34 707/626 |
| 2011/0283257 A1* | 11/2011 | Charisius et al. | 717/109 |
| 2012/0159424 A1* | 6/2012 | Shukla | G06F 8/34 717/103 |
| 2012/0159425 A1* | 6/2012 | Shukla | G06F 8/35 717/104 |
| 2014/0082131 A1 | 3/2014 | Jagtap | |
| 2014/0108483 A1 | 4/2014 | Tarta et al. | |

OTHER PUBLICATIONS

Jan Hannemann and Gregor Kiczales, Design pattern implementation in Java and aspectJ, [Online] 2002, Sigplan Not. 37, 11 (Nov. 2002), [Retrieved from the Internet] <http://doi.acm.org/10.1145/583854.582436> pp. 161-173.*

Jing Dong; Yang Sheng; Kang Zhang, Visualizing Design Patterns in Their Applications and Compositions, [Online] 2007 Software Engineering, IEEE Transactions on , vol. 33, No. 7, [Retrieved from the Internet] <http://ieeexplore.ieee.org/stamp/stamp.jsp?tp=&arnumber=4227827&isnumber=4227824> pp. 433-453.*

Giuseppe Castagna, Nils Gesbert, and Luca Padovani, A theory of contracts for Web services, [Online] 2009, ACM Trans. Program. Lang. Syst. 31, 5, Article 19 (Jul. 2009), [Retrieved from the Internet] <http://doi.acm.org/10.1145/1538917.1538920> 61 pages.*

Ngu, et al., Semantic-Based Mashup of Composite Applications, [Online] 2010, Services Computing, IEEE Transactions on , vol. 3, No. 1, Jan.-Mar. 2010, [Retrieved from the Internet] <http://ieeexplore.ieee.org/stamp/stamp.jsp?tp=&arnumber=5432153&isnumber=5440876> pp. 2-15.*

Jing Dong; Tu Peng; Zongyan Qiu, Commutability of Design Pattern Instantiation and Integration, [Online] 2007, Theoretical Aspects of Software Engineering, 2007. TASE '07. First Joint IEEE/IFIP Symposium on , vol. no., Jun. 6-8, 2007, [Retrieved from the Internet] <http://ieeexplore.ieee.org/stamp/stamp.jsp?tp=&arnumber=4239972&isnumber> pp. 283-292.*

Fraternali et al., Engineering rich internet applications with a model-driven approach, [Online] Apr. 2010, ACM Trans. Web 4, 2, Article 7 (Apr. 2010), [Retrieved from the Internet] <http://dx.doi.org/10.1145/1734200.1734204> 47 pages total.*

Chiril Chidisiuc and Gabriel A. Wainer, CD++Builder: an eclipse-based IDE for DEVS modeling, [Online] 2007, In Proceedings of the 2007 spring simulation multiconference—vol. 2 (SpringSim '07), vol. 2. Society for Computer Simulation International, San Diego, CA, USA, [Retrieved from the Internet] <http://delivery.acm.org/10.1145/> pp. 235-240.*

Jack Greenfield, Software Factories: Assembling Applications with Patterns, Models, Frameworks, and Tools, [Online] Nov. 2004, [Retrieved from the Internet] <http://uosis.mif.vu.lt/~donatas/Vadovavimas/Temos/MDD/SoftwareFactories/Greenfield 2004%20-%20Software%20Factories%20-%20Assembling% 20Applications.pdf> 9 pages total.*

Pablo Santos, Distributed Software Development Explained, Jul. 3, 2008, (9 pages).

Integrated Development Environment, Oct. 15, 2010, (4 pages).

Homer, Alex, "Components and Web Application Architecture", Published on: Apr. 3, 2008, Available at <<http://technet.microsoft.com/en-us/library/bb727121.aspx>>.

"International Search Report & Written Opinion for PCT Patent Application No. PCT/US2013/065149", Mailed Date: Jan. 30, 2014, Filed Date: Oct. 16, 2013, 8 pages.

Forsberg, Christian, "Managing Remote Devices with Odyssey Athena and XML Web Service", Aug. 2005, Available at <<http://msdn.microsoft.com/en-us/library/ms839347.aspx>>.

Verheecke, Bart, et al., "AOP for Dynamic Configuration and Management of Web Services", 2003, (The month of Publication is irrelevant since the year of Publication is clearly prior to the filing of the Application) Available at <<http://ssel.vub.ac.be/wsml/papers/Verheecke_Cibran_ICWS03.pdf>>.

(56) References Cited

OTHER PUBLICATIONS

Amirian, Pouria, et al., "A Hybrid Architecture for Implementing Efficient Geospatial Integrating.Net Remoting and Web Services Technologies", 2003, (The month of Publication is irrelevant since the year of Publication is clearly prior to the filing of the Application) Available at <<http://serv2.ist.psu.edu:8080/viewdoc/summary;jsessionid=10EC96C9E1E428C1E942CDD2E791F4C?doi=10.1.1.111.4103>>.

First Office Action and Search Report Received for China Patent Application No. 201110447787.2, Mailed Date: Jan. 10, 2014, 18 pages.

Second Office Action Received for China Patent Application No. 201110447787.2, Mailed Date: Sep. 23, 2014, 16 pages.

U.S. Appl. No. 13/653,255, mail date Sep. 25, 2014, Office Action.

U.S. Appl. No. 12/364,970, mail date Mar. 15, 2011, Office Action.

U.S. Appl. No. 12/364,970, mail date Jul. 15, 2011, Notice of Allowance.

"Third Office Action and Search Report Issued in Chinese Patent Application No. 201110447787.2", Mailed Date: Mar. 24, 2015, 20 Pages.

Office Action dated May 27, 2015 cited in U.S. Appl. No. 13/653,255.

\* cited by examiner

PLATFORM FOR DISTRIBUTED APPLICATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed for use on distributed systems. For example, composite applications may include a complex set of related components. The components have relationships with other components, as well as specified communication protocols for inter-component communication. Deploying and managing such software applications typically involves the implementation of many different tools and development environments.

BRIEF SUMMARY

Embodiments described herein are directed to providing an application model to deploy and manage composite applications and to providing model-driven software coding assistance. In one embodiment, a computer system instantiates an application design interface that is configured to display composite application components and relationships between the components. Each component includes information specifying how communication is to be conducted with the component. The computer system accesses an application manifest that includes the components and component relationships of the application. The computer system displays the composite application's components and component relationships in the instantiated visual application design interface according to the application manifest.

In another embodiment, a computer system accesses an application manifest that includes software components and relationships between the components. The manifest is editable by a user. The computer system receives a user input indicating that at least one of multiple different components is to be implemented as part of the composite application. The computer system determines potential implementation options that are to be presented to the user as selectable options based on the components and relationships of the application manifest. The computer system also displays the determined potential implementation options in the manifest for selection by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
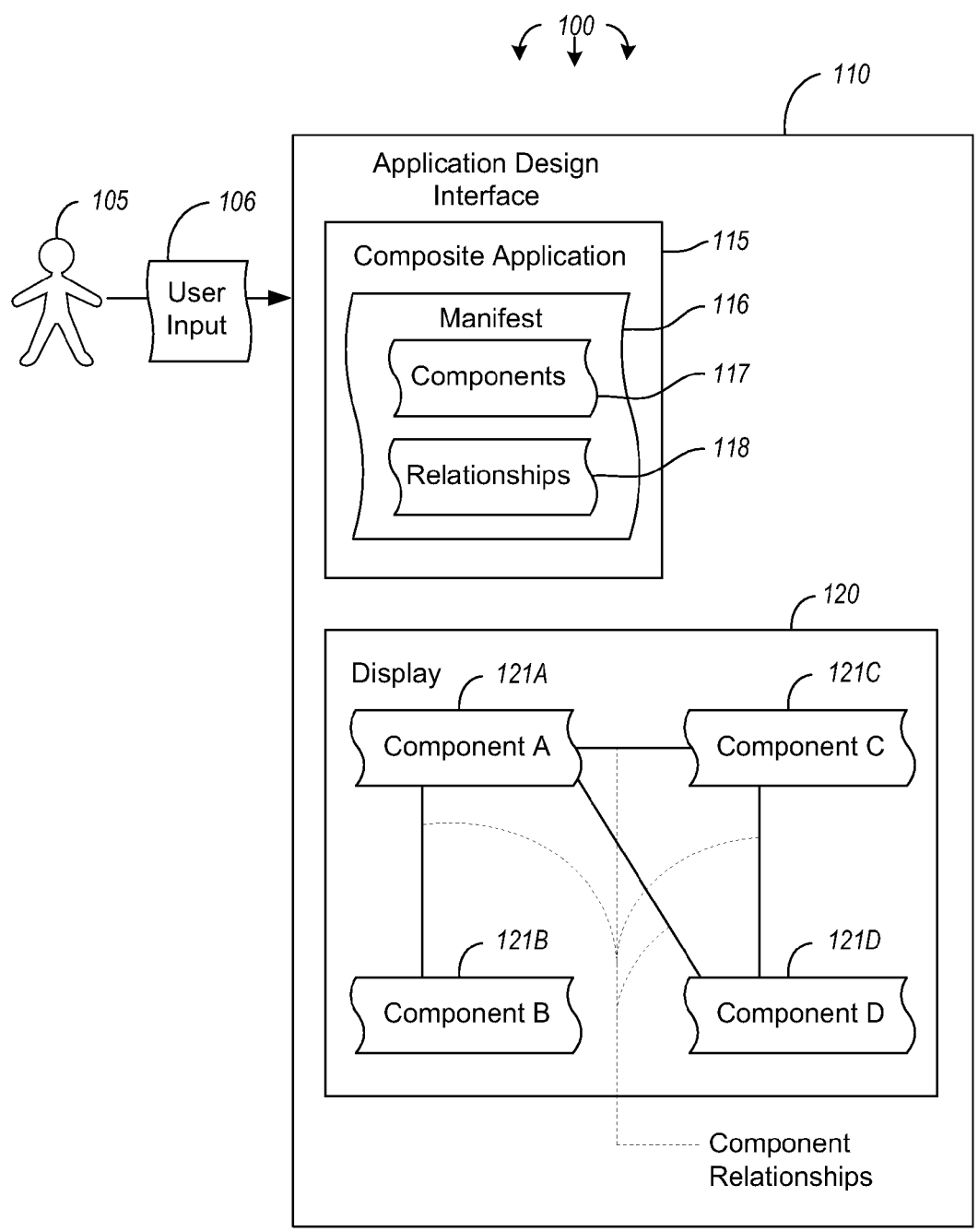
FIG. 1 illustrates a computer architecture in which embodiments of the present invention may operate including providing an application model to deploy and manage composite applications and providing model-driven software coding assistance.

Embodiments described herein are directed to providing an application model to deploy and manage composite applications and to providing model-driven software coding assistance. In one embodiment, a computer system instantiates an application design interface that is configured to display composite application components and relationships between the components. Each component includes information specifying how communication is to be conducted with the component. The computer system accesses an application manifest that includes the components and component relationships of the application. The computer system displays the composite application's components and component relationships in the instantiated visual application design interface according to the application manifest.

In another embodiment, a computer system accesses an application manifest that includes software components and relationships between the components. The manifest is editable by a user. The computer system receives a user input indicating that at least one of multiple different components is to be implemented as part of the composite application. The computer system determines potential implementation options that are to be presented to the user as selectable options based on the components and relationships of the application manifest. The computer system also displays the determined potential implementation options in the manifest for selection by the user.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes application design interface 110. The application design interface may be any type of user interface that allows interaction with a software program. The interface may allow a variety of different input methods including keyboard, mouse, touchscreen or other inputs. The application design interface may be configured to allow users to design applications, including composite application 115.

Composite applications, as used herein, refer to applications that are composed of multiple different components 117 that are tied together in a plurality of different component relationships 118. The composite applications may be configured to run on both local computer systems as well as distributed computer systems (including on the cloud), without any changes to the code. The components and relationships that make up a given composite application may be stored in the application's manifest 116. The manifest may list each component that is part of the application, as well as how each component relates to the other components. For instance, some components may have dependencies on certain resources or on other components.

As shown in display 120, components may have various different relationships with each other. Component A (121A) may have relationships with components B (121B), C (121C) and D (121D), as indicated by the lines between components. Similarly, components C and D also have a relationship. As mentioned above, the relationship may be a dependency, a communication channel, or some other type of relationship. Each component may have a specified way of communicating with other components. Relationships may specify how the component communicates and is to be communicated with. Different types of relationships may be displayed in different manners. For instance, different types of lines, different colors, different connectors and other visual items may be used to distinguish the various types of relationships. It should be noted that while display 120 is showing four components and one type of relationship between those components, substantially any number of components and/or relationships may be shown in the display of the application design interface.

Users may interact directly with the composite application's components in the display. Users may add, remove or modify components, as well as add, remove or modify component relationships. For example, user 105 may send an edit 106 to the application design interface that removes component A. The manifest 116 for composite application 115 would be updated to no longer include component A or its component relationships, and display 120 would be updated to no longer show component A and its relationships. In this manner, a user may change and modify an application using the visual application design interface. As changes are made, the application's manifest is dynamically updated to show the user's changes.

In some embodiments, the application design interface 110 may comprise a set of extensions to an integrated development environment (IDE) designed to allow authoring of a distributed application. Such extensions may include any one or more of the following: a visual modeling environment to visualize the application, as well as the application's components and relationships, a set of IDE integration synchronizers to coordinate changes between components and the application model, code editor based helpers to facilitate coding against the programming model and integration with the deployment system within the IDE to deploy the application according to the configuration specified in the application model.

Some embodiments may include a visual modeling of the composite application coupled with a distributed composition runtime and distributed application deployment experience. Furthermore, a code based authoring environment may be provided which is based on or driven off the application model. Embodiments may further provide extensibility provided through integration with IDE file system providers in order to keep artifacts in sync and react to changes made to files and changes made explicitly to the application model itself. Still further, embodiments may present patterns within the application design interface which facilitate quick start development of the composite application.

The application design interface may be configured to visualize composite applications, their components and relationships. The application design interface provides both a listing of the components within the application as well as the relationships between the components. Within the application design interface, each component may specify imports and exports, or in other words, a communication standard or protocol for communicating with the component. The visual design interface allows for both the connection of the imports and exports, which establishes a relationship between the components, but also the configuration of the connection. This configuration allows the user precise control over the runtime manifestation of component relationships, and allows the distributed runtime to properly allocate resources to meet the needs of the configuration.

In some cases, configuration of a component relationship could specify a filter for the data to be returned via the relationship, or may specific a service-level agreement for the level of performance required on that link. That information may be used at deployment and runtime to ensure that resources are allocated in such a way that the service-level agreement will be met. This representation of composition is useful at design time, as well as a tool for monitoring the application.

In some embodiments, the application design interface 110 may provide total control of the application by presenting the user with a blank canvas for creating the application. In some cases, however, the user may be provided a pattern so that they can rapidly get a solution up and running for testing and further iteration. The design interface may provide such patterns in a toolbox. By dragging these onto a canvas, the application model may be pre-populated with a configured set of components and relationships. This would allow a user to select an application pattern and create all of the corresponding artifacts for that application. In some cases, this may be similar to a "paint-by-numbers" model of operation where a user can select a certain pattern to achieve a given result.

The application design interface may be configured to provide a representation of the code-base artifacts within the system. The design interface may include an editor which operates as a direct projection of the manifest. The editor provides a projection of the object graph that is serialized into the manifest file. This allows the application design interface to stay in sync with the code representation.

In some cases, the application interface may comprise a set of extensions to an IDE which track changes made throughout the file system and reflect those changes into the manifest file. These extensions may form a single point of interaction between the manifest and the artifacts within the composite application. Additionally, these extensions may also operate in the other direction as well, being continually notified of changes within the manifest. The extensions may then be used to make subsequent changes to the project system. For example, if an import is configured on a web application, the synchronizer may choose to add new assembly references to the web application, inject code, or update configurations to take advantage of a new component reference.

In some cases, the extensions, which may be referred to herein as "synchronizers", are themselves extensible. The extensions provide the author of a component control over the synchronization that occurs between the changes within the file system of that component and the application manifest. For example, the synchronizer for a simple object access protocol (SOAP) web service component may be able to operate on the files in the SOAP web service, read the communication specification, and report to the manifest how communication is to be conducted with that web service component. As such, each of the components and the components' manifest may be kept up to date in real time.

In some cases, after a user has created a composite application using a combination of components 117, software code may be written to implement a component (for instance, calling a workflow from another application). In such cases, the application design interface directly leverages the application model to not only present to the user a set of types that could be used, but to guide the user to implement the components that are used in the application as well as the ones that are related to that component. Thus, for example, if a cache component is wired to a web application, code helpers or hints may be provided to correctly implement the cache component in the composite application.

The application design interface may also provide another set of extensibility for the component author to be able to customize the developer experience that someone has upon using their component (e.g. a cache component may have a different developer/user experience than a web service). The design interface may provide contextually relevant options for entering code or making component selections. These and other concepts will be explained in greater detail below with regard to methods 200 and 300 of FIGS. 2 and 3, respectively.

Figure 2:
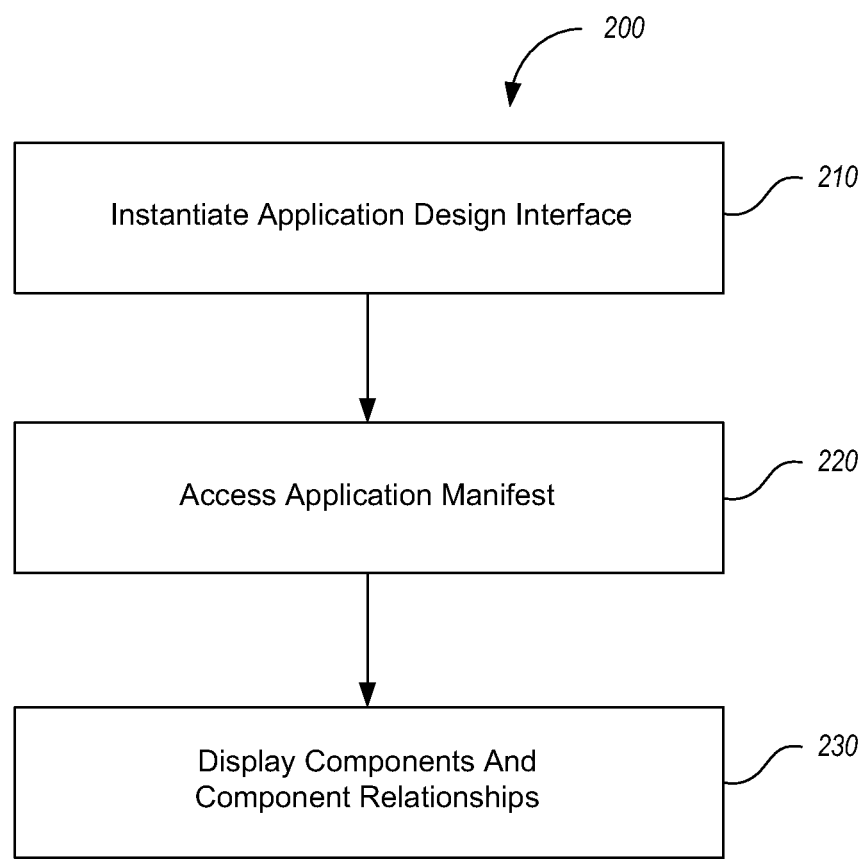
FIG. 2 illustrates a flowchart of an example method for providing an application model to deploy and manage composite applications.
Figure 3:
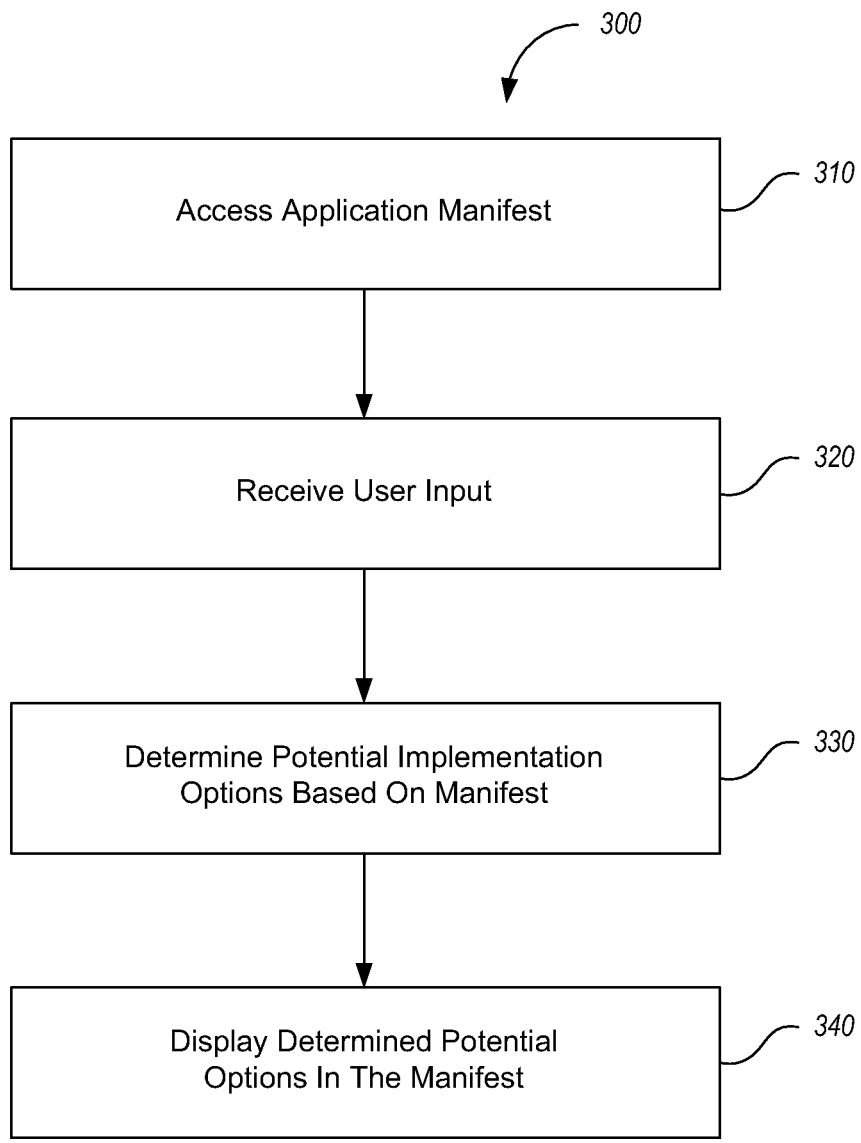
FIG. 3 illustrates a flowchart of an example method for providing model-driven software coding assistance.
Figure 4:
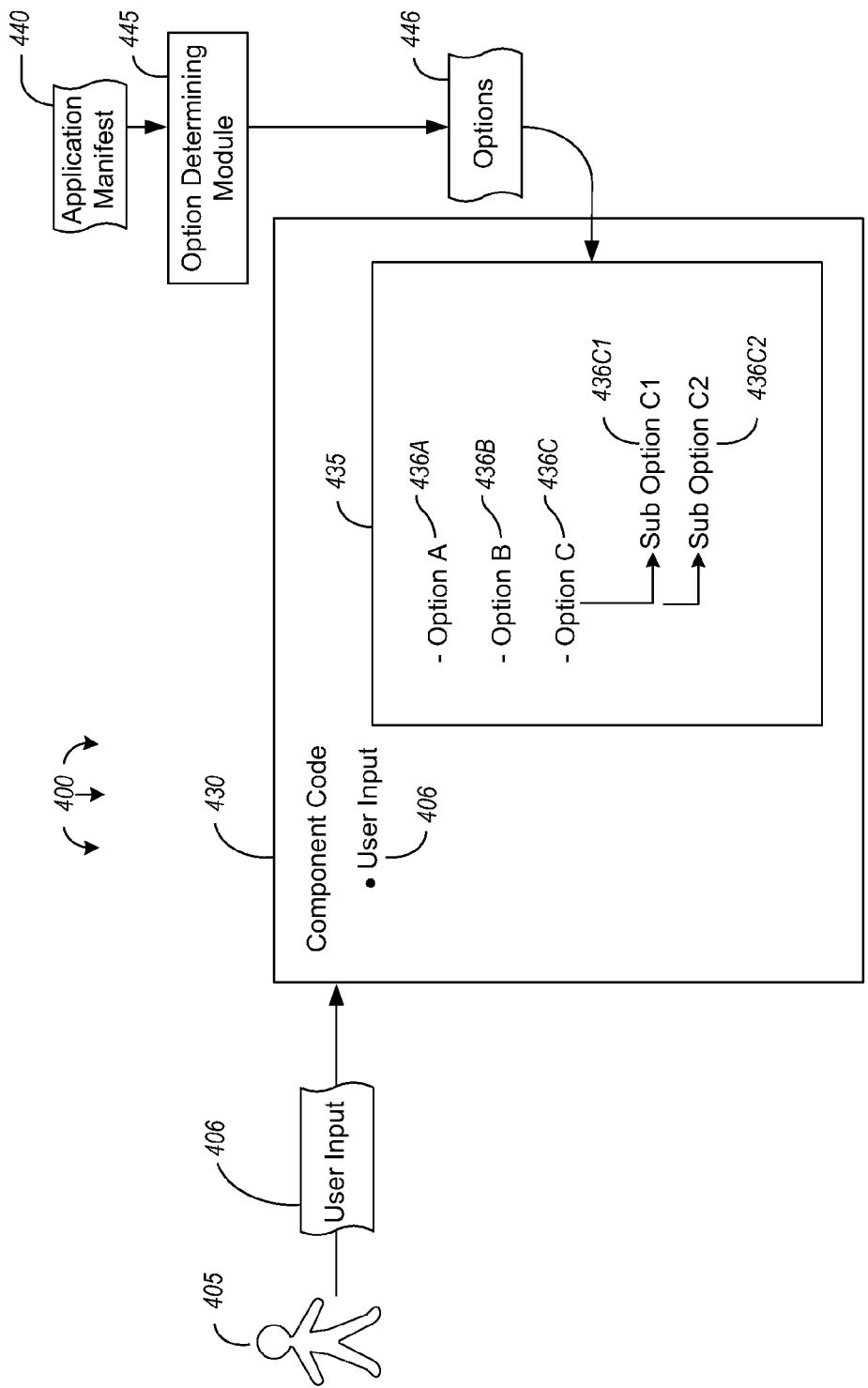
FIG. 4 illustrates an embodiment of the present invention in which user inputs are applied in component code.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an application model to deploy and manage composite applications. The method 200 will now be described with frequent reference to the components and data of environment 100.

Method 200 includes an act of instantiating an application design interface that is configured to display composite application components and one or more relationships between the components, wherein each component includes information specifying how communication is to be conducted with the component (act 210). For example, application design interface 110 may be instantiated on a computer system. Display 120 of the interface may be configured to illustrate application components (e.g. components A, B, C and D (121A-D)) and relationships between the components. Each application component may include information (e.g. metadata) specifying how communication is to be conducted with the component (i.e. the component's imports and exports).

The application design interface may allow users to edit multiple different artifacts including application definition, application manifest, and composition model. The application manifest 116 may include information indicating which components 117 and are included in the application, as well as the corresponding relationships 118 between those components. User 105 may send an edit 106 which is to be applied to composite application 115 and/or to various artifacts of the application including those listed above. Edited artifacts may be sent to a distributed runtime so that they will be used during execution of the application.

In some cases, the editable application artifacts may allow users to change deployment-time and runtime behavior of the composite application. In this manner, a user may have a great deal of control over how a composite application is deployed and executed. In some cases, composite application 115 may be configured and deployed using the manifest file 116. As such, instructions in the manifest are followed when deploying and executing the application. At runtime, application components may communicate with each other using the relationships indicated in the application manifest.

Method 200 includes an act of accessing an application manifest that includes the components and component relationships of the application (act 220). For example, the application design interface 110 may access application manifest 116 which identifies the composite application's corresponding components 117 and component relationships 118. In some cases, after selecting which components are to be used in a given application, a user may add additional portions of software code to modify the components or how the components are used together.

When the user is making such code changes or additions, the application interface may provide textual hints while the user is typing. The textual hints may be contextual and may be based on the application's manifest. Thus, the textual hints may include a contextual listing of manifest-specific items. Moreover, the textual hints may show only valid connections or relationships between two components, based on the component relationships in the application manifest. In such cases, if a user is entering code that relates to component A (121A), the textual hints may include component information and relationships specific to component A. As changes are made to software code, and as changes are made adding or removing components from an application, the application's manifest may be dynamically updated to ensure that the manifest remains up to date.

Method 200 includes an act of displaying the composite application's components and component relationships in the instantiated visual application design interface according to the application manifest (act 230). For example, display 120 may display composite application 115's components 117 and component relationships 118 in the application design interface based on the application's manifest 116. In some cases, the application design interface may be configured to render a deployed application to show a runtime visual of the composite application as defined by application manifest. The runtime visual may indicate how the application is to be executed at runtime.

The application design interface may also be configured to provide a set of canonical application patterns that allow users to configure the components of the composite application according to predefined pattern. For instance, the predefined pattern may include an N-tier pattern. When the N-tier pattern is applied to the composite application 115, the application is formed in a tiered pattern. The tiers may include, for example, back-end server, web service and user interface. Other patterns, of course, are possible, and the above example is not intended to be limiting. The canonical patterns may be layered together in some cases, to configure the application components according to a plurality of different patterns. After such a canonical pattern has been applied, the composite application may be modified using software code.

Turning now to FIG. 3, FIG. 3 illustrates a flowchart of a method 300 for providing model-driven software coding assistance. The method 300 will now be described with frequent reference to the components and data of environment 400.

Method 300 includes an act of accessing an application manifest that includes software components and one or more relationships between the components, wherein the manifest is editable by a user (act 310). For example, application manifest 440 may accessed via an application design interface and may be edited by user 405. The manifest includes an identification of software components and component relationships between the components that correspond to a composite application.

Method 300 includes an act of receiving a user input indicating that at least one of a plurality of components is to be implemented as part of the composite application (act 320). For example, user 405 may send user input 406 to an application design interface. The input may indicate that one or more components are to be used in conjunction with each other to form a composite application. In some cases, the application design interface allows users to select (perhaps from a list or other grouping) which components are to be used in a given composite application. As the user is selecting or modifying an already selected component, potential implementation options may be presented to the user.

Method 300 includes an act of determining one or more potential implementation options that are to be presented to the user as selectable options based on the components and relationships of the application manifest (act 330). For example, option determining module 445 may access application manifest 440 to determine which components and corresponding relationships are available for a given application. In cases where a user is editing a selected component, the option determining module may return options 446 that are specific to that component.

Thus, in one example, user 405 may be editing component code 430. The user's input 406 may be displayed in the display and, as the user is entering text, an options box 435 (or other presentation form) may be displayed next to the user's input. The option box may include various different options including option A (436A), option B (436B), option C (436C) and sub-options 436C1 and 436C2. Of course, many more (or fewer) options may be provided. In some cases, the potential implementation options may be displayed dynamically as the user is entering information. The dynamically displayed potential components may be different based on which composite application (or application component) is currently being edited. At least in some cases, only those implementation options that are contextually relevant are displayed to the user. The options may be in the form of a list of selectable options or in some other (perhaps user-customizable) form.

Method 300 also includes an act of displaying the determined potential options for selection by the user (act 340). For example, each of the contextually-relevant options 436A-436C may be displayed to the user. The display may include the selectable options (which may include component names, function names, properties or other data), as well as other information which may be useful in determining how to modify the application or application component.

Accordingly, systems, methods and computer program products are provided which provide an application model to deploy and manage composite applications. The application model displays and allows editing of a composite application's components and component relationships. Moreover, systems, methods and computer program products are provided which provide model-driven software coding assistance. Such assistance is context-specific and is provided dynamically while the user is providing input into the application model.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for providing an application model to deploy and manage composite applications, the method comprising:
   an act of instantiating an application design interface that is configured to display composite application components and one or more relationships between the components;
   an act of accessing an application manifest that includes the components and component relationships of the application, wherein each component includes information specifying how communication is to be conducted with the component, specifying a list of imports and exports for the component, specifying a communication standard, and specifying a required level of performance for communication with the component such that, at deployment and runtime, resources may be allocated at runtime to ensure the required level of performance for communication will be met;
   an act of the application design interface providing a set of canonical application patterns that allow users to configure the components of the composite application according to a predefined pattern;
   an act of displaying the composite application's components and component relationships in the instantiated visual application design interface according to the application manifest; and
   providing a set of extensions to an integrated development environment (IDE), the set of extensions including a visual modeling environment and a set of IDE integration synchronizers to coordinate changes between the components and the application model.

2. The method of claim 1, wherein the application design interface allows users to edit at least one of the following artifacts: application definition, application manifest, and composition model.

3. The method of claim 2, wherein the edited artifact is sent to a distributed runtime for execution of the application.

4. The method of claim 2, wherein the artifacts allow users to change deployment-time and runtime behavior of the composite application.

5. The method of claim 4, wherein the composite application is configured and deployed using the manifest file.

6. The method of claim 4, wherein components communicate with each other at runtime using the relationships indicated in the application manifest.

7. The method of claim 1, wherein the application design interface renders a deployed application to show a runtime visual of the composite application as defined by application manifest.

8. The method of claim 1, wherein the predefined pattern comprises an N-tier pattern, such that upon applying the N-tier pattern to the composite application, the composite application is formed in a tiered pattern.

9. The method of claim 8, wherein the composite application is modifiable using software code after the canonical pattern has been applied.

10. The method of claim 1, wherein a plurality of canonical application patterns are layered together to configure the components of the composite application.

11. The method of claim 1, wherein the application design interface provides textual hints while user inputs are being received for the application manifest, the textual hints comprising a contextual listing of manifest-specific items.

12. The method of claim 11, wherein the textual hints only list valid connections between two components, based on the component relationships in the application manifest.

13. The method of claim 1, wherein the manifest is dynamically updated as changes are made to software code corresponding to components of the composite application.

14. A computer program product for implementing a method for providing model-driven software coding assistance, the computer program product comprising one or more computer-readable storage devices having stored thereon computer-executable instructions that, when executed by one or more processors of the computing system, cause the computing system to perform the method, the method comprising:
   an act of accessing an application manifest that includes software components and one or more relationships between the components, each component including information specifying how communication is to be conducted with the component, specifying a list of imports and exports for the component, specifying a communication standard, and specifying a required level of performance for communication with the component such that, at deployment and runtime, resources may be allocated at runtime to ensure the required level of performance for communication will be met, and wherein the manifest is editable by a user;
   an act of receiving, through an application design interface, a user input indicating that at least one of a plurality of components is to be implemented as part of the composite application, the application design interface providing a set of canonical application patterns that allow users to configure the components of the composite application according to a predefined pattern;
   providing a set of extensions to an integrated development environment (IDE), the set of extensions including a visual modeling environment and a set of IDE integration synchronizers to coordinate changes between the components and the composite application;
   an act of determining one or more potential implementation options that are to be presented to the user as selectable options based on the components and relationships of the application manifest; and
   an act of displaying the determined potential options for selection by the user.

15. The computer program product of claim 14, wherein the potential implementation options are displayed dynamically as the user is entering information.

16. The computer program product of claim 15, wherein the dynamically displayed potential options are different based on which composite application is currently being edited.

17. The computer program product of claim 15, wherein only those implementation options that are contextually relevant are displayed to the user.

18. The computer program product of claim 15, wherein the potential implementation options are displayed as a list of selectable options.

19. A computer system comprising the following:
one or more processors;
system memory;
one or more computer-readable storage media having stored thereon computer-executable instructions that, when executed by the one or more processors, causes the computing system to perform a method for providing an application model to deploy and manage composite applications, the method comprising the following:
an act of instantiating an application design interface that is configured to display composite application components and one or more relationships between the components;
an act of accessing an application manifest that includes the components and component relationships of the application, wherein each component includes information specifying how communication is to be conducted with the component, specifying a list of imports and exports for the component, specifying a communication standard, and specifying a required level of performance for communication with the component such that, at deployment and runtime, resources may be allocated at runtime to ensure the required level of performance for communication will be met;
an act of the application design interface providing a set of canonical application patterns that allow users to configure the components of the composite application according to a predefined pattern, wherein the composite application is modifiable after the canonical pattern has been applied using software code; and
an act of displaying the composite application's components and component relationships in the instantiated visual application design interface according to the application manifest; and
providing a set of extensions to an integrated development environment (IDE), the set of extensions including a visual modeling environment and a set of IDE integration synchronizers to coordinate changes between the components and the application model.

* * * * *